(12) United States Patent
Kantabutra

(10) Patent No.: US 6,366,939 B1
(45) Date of Patent: Apr. 2, 2002

(54) APPARATUS FOR COMPUTING EXPONENTIAL AND TRIGONOMETRIC FUNCTIONS

(76) Inventor: Vitit Kantabutra, 5199 W. Buckskin Rd., Pocatello, ID (US) 83201

( * ) Notice: Subject to any disclaimer, the term of this patent is extended or adjusted under 35 U.S.C. 154(b) by 0 days.

(21) Appl. No.: 09/504,222

(22) Filed: Feb. 15, 2000

Related U.S. Application Data

(62) Division of application No. 09/028,178, filed on Feb. 3, 1998, now Pat. No. 6,055,553.
(60) Provisional application No. 60/039,809, filed on Feb. 25, 1997.

(51) Int. Cl.[7] .............................. G06F 7/38; G06F 1/02
(52) U.S. Cl. ...................................... 708/440; 708/276
(58) Field of Search ................................ 708/290, 276, 708/277, 440, 441

(56) References Cited

U.S. PATENT DOCUMENTS

| | | | | |
|---|---|---|---|---|
| 4,910,698 A | * | 3/1990 | McCartney | 708/276 |
| 4,956,799 A | * | 9/1990 | Nakayama | 708/440 |
| 5,737,253 A | * | 4/1998 | Madisetti | 708/276 |
| 6,317,764 B1 | * | 11/2001 | Rarick | 708/270 |

* cited by examiner

*Primary Examiner*—Chuong Dinh Ngo

(57) ABSTRACT

A 64-bit precision digital circuit for computing the exponential function and a related 64-bit precision digital circuit for computing sine and cosine, each circuit comprising a master circuit and a slave circuit. The master circuit computes the remainders $\tilde{x}_i$ for every "logical" iteration i using fast, low-precision circuit, thereby accumulating temporary errors. Only at the end of every 8 i's, which marks the end of a "physical" iteration, is a complete and fast correction to the accumulated errors performed. The slave circuit computes quantities called the $y_i$'s, which will eventually converge to the desired output.

2 Claims, 8 Drawing Sheets

```
00 .101100010111001000010111111101111101000111001111011110011010110 0 (not stored)
01 .011001111100110010001111101100101111111001100001001011111100101 1
02 .001110010001111111101111100011110011010100110100010000110101100 0
03 .000111100010011100000110110110001010101111001011100101111010 10
04 .000011110000101000110000110000000001000101100010101001100110001
05 .000001111110000010100110110000111001111000001100110000000001001 1
06 .000000111111100000010101000101100001111110000000011111000111101 0
07 .000000011111111000000010101001101011000100000110011110001001000 0
08 .000000001111111110000000001010101000101011000100001011110000000 10
09 .000000000111111111100000000010101010011010101100010000111001101 0
10 .000000000011111111111000000000001010101010001010101100010000111 11
11 .000000000001111111111110000000000001010101010011010101011000100 01
12 .C00000000000111111111111100000000000010101010101000101010101100 1
13 .C00000000000011111111111111000000000000010101010101001101010101 1
14 .C00000000000000111111111111111000000000000001010101010101000101 01
15 .000000000000000011111111111111110000000000000000101010101010100 111
16 .000000000000000001111111111111111100000000000000000101010101010 101
17 .000000000000000000111111111111111111000000000000000000101010101 011
18 .000000000000000000011111111111111111110000000000000000000101010 101
19 .000000000000000000001111111111111111111100000000000000000000101 011
20 .000000000000000000000111111111111111111111000000000000000000000 101
21 .000000000000000000000011111111111111111111110000000000000000000 001
22 .000000000000000000000001111111111111111111111100000000000000000 000
23 .000000000000000000000000111111111111111111111111000000000000000 000
24 .000000000000000000000000011111111111111111111111110000000000000 000
25 .000000000000000000000000001111111111111111111111111100000000000 000
26 .000000000000000000000000000111111111111111111111111111000000000 000
27 .000000000000000000000000000011111111111111111111111111110000000 000
28 .000000000000000000000000000001111111111111111111111111111110000 000
29 .000000000000000000000000000000111111111111111111111111111111110 0000
30 .000000000000000000000000000000011111111111111111111111111111111 000
31 .000000000000000000000000000000001111111111111111111111111111111 110
32 .000000000000000000000000000000000010000000000000000000000000000 000
33 .000000000000000000000000000000000001000000000000000000000000000 000
34 .000000000000000000000000000000000000100000000000000000000000000 000
```

.
.
.

```
64 .000000000000000000000000000000000000000000000000000000000000000 001
```

Fig. 4 i                  $\log(1+2^{**}(-i))$

| i | arctan (2**(-i)) |
|---|---|
| 0 | .1100100100001111110110101010001000100001011010001100001000110101 |
| 1 | .0111011010110001100111000001010110000110111011010011110110100011 |
| 2 | .0011111010110110111010111111001001011001000000011011101011000110 |
| 3 | .0001111111010101101110101001101010101100001011110110110111000111 |
| 4 | .0000111111111010101011011101101110010110011111101111010011100100 |
| 5 | .0000011111111110101010101101110111010100101110110001001001010011 |
| 6 | .0000001111111111110101010101011011101110110111001010011010101111 |
| 7 | .0000000111111111111110101010101010110111011101110101001011100111 |
| 8 | .0000000011111111111111110101010101010101101110111011101101101110101 |
| 9 | .0000000001111111111111111110101010101010101010110111011101110111 |
| 10 | .0000000000111111111111111111110101010101010101010101101110111100 |
| 11 | .0000000000011111111111111111111110101010101010101010101010110111100 |
| 12 | .0000000000001111111111111111111111110101010101010101010101010101110 |
| 13 | .0000000000000111111111111111111111111110101010101010101010101010110 |
| 14 | .0000000000000011111111111111111111111111111010101010101010101011 |
| 15 | .0000000000000001111111111111111111111111111110101010101010101010110 |
| 16 | .0000000000000000111111111111111111111111111111111010101010101011 |
| 17 | .0000000000000000011111111111111111111111111111111111010101010110 |
| 18 | .0000000000000000001111111111111111111111111111111111111010101011 |
| 19 | .0000000000000000000111111111111111111111111111111111111111010110 |
| 20 | .0000000000000000000011111111111111111111111111111111111111111011 |
| 21 | .0000000000000000000001000000000000000000000000000000000000000000 |
| 22 | .0000000000000000000000100000000000000000000000000000000000000000 |
| 23 | .0000000000000000000000010000000000000000000000000000000000000000 |
| 24 | .0000000000000000000000001000000000000000000000000000000000000000 |
| 25 | .0000000000000000000000000100000000000000000000000000000000000000 |
| 26 | .0000000000000000000000000010000000000000000000000000000000000000 |
| 27 | .0000000000000000000000000001000000000000000000000000000000000000 |
| 28 | .0000000000000000000000000000100000000000000000000000000000000000 |
| 29 | .0000000000000000000000000000010000000000000000000000000000000000 |
| 30 | .0000000000000000000000000000001000000000000000000000000000000000 |
| 31 | .0000000000000000000000000000000100000000000000000000000000000000 |
| 32 | .0000000000000000000000000000000010000000000000000000000000000000 |
| 33 | .0000000000000000000000000000000001000000000000000000000000000000 |
| 34 | .0000000000000000000000000000000000100000000000000000000000000000 |
| . | |
| . | |
| . | |
| 64 | .0000000000000000000000000000000000000000000000000000000000000001 |

Fig. 6

| i | arctan (2**(-i)) |
|---|---|
| 0 | .11001010 |
| 1 | .011101110 |
| 2 | .0011111011 |
| 3 | .00011111111 |
| 4 | .000100000000 |
| 5 | .0000100000000 |
| 6 | .00000100000000 |
| . | |
| . | |
| . | |
| 63 | .000000000000000000000000000000000000000000000000000000000000010 |
| 64 | .0000000000000000000000000000000000000000000000000000000000000001 |

Fig. 7

| original bits | | signed digit bits |
| --- | --- | --- |
| bit i-1 | bit i | bit i |
| 0 | 0 | $\bar{1}$ |
| 0 | 1 | $\bar{1}$ |
| 1 | 0 | 1 |
| 1 | 1 | 1 |

Fig. 8

APPARATUS FOR COMPUTING EXPONENTIAL AND TRIGONOMETRIC FUNCTIONS

This application claims the benefit of U.S. Provisional Application No. 60/039,809, filed Feb. 25, 1997, and a Divisional of U.S. application Ser. No. 09/028,178 filed Feb. 3, 1998, now U.S. Pat. No. 6,055,553.

FIELD OF THE INVENTION

The present invention relates to integrated circuits, and more particularly to integrated circuits for performing arithmetic operations.

BACKGROUND OF THE INVENTION

Many microprocessors such as the popular Intel X86 series and their clones contain apparatus for computing exponential and trigonometric functions. Such functions are useful in diverse areas of engineering, science, and mathematics, as well as in computer graphics applications. Using previously known methods, such functions may take a long time to compute. For example, the computation of sine and cosine functions can take approximately 100 clock cycles for some operands on the Intel Pentium processor and more than 300 clock cycles on the Intel 486.[1]

[1] This information came from a document entitled "Everything You Always Wanted to Know about Math Coprocessors," published on the Internet by Norbert Juffa.

We will now reference various known types of circuits for computing exponential and trigonometric functions.

1. Table lookup method. The pure table lookup method involves keeping a table of the values of the function to be computed for every possible argument x. This approach was seriously considered for 16 bits of precision, but is no longer feasible for higher precision processors such as the high-end processors of today. Table-lookups are now only feasible for approximating such functions, as disclosed in U.S. Pat. No. 5,224,064, entitled "Transcendental Function Approximation Apparatus and Method," to M. Henry and G. Martin.

2. Polynomial approximation method. For example one could compute $e^x$ by using the first "few" terms of the infinite series $$e^x = \sum_{i=0}^{\infty} \frac{x^i}{i!}.$$

This series converge quickly for small values of x but converges too slowly for larger values of x. There are other series than power series that may lead to better convergence. However, it is not clear how to speed up such a procedure further. For example, it is not clear how to combine several iterations into one.

3. Combined method. It is possible to combine the two aforementioned methods. Tang, for example, (P. T. P. Tang, "Table-lookup algorithms for elementary functions and their error analysis," Proc. 10th Symp. Computer Arith.) designed such a method, which is used in the Intel Pentium processor. However, like the previous method, it is not clear how to speed up such a procedure further.

4. Method of rational approximation. This method is efficient, but requires a very fast divider, which is expensive.

5. Digit-by-digit methods. This class of methods, which includes the new one discussed in this document, is a very commonly used class of methods for hardware evaluation of exponential, trigonometric, and other transcendental functions. The methods in this class are based on simple iterative equations that imply only addition/subtraction and shift operations. Simple as the methods may be, they traditionally suffer from slow linear convergence.

These iterative methods were first discovered by Volder (J. E. Volder, "The CORDIC Trigonometric Computing Technique," IRE Trans. Electronic Computers," Vol. 8, pp. 330–334, 1959). Recent references include a U.S. Patent (Nakayama, U.S. Pat. No. 4,956,799, Sep. 11, 1990) where the inventor called these iterative methods "pseudo-division."

The principles behind these iterative methods for computing transcendental functions will now be described.

The basic, well-known method for computing $e^x$ for $x \in [0, \ln 2)$ involves 2 recurrences, as follows:

$$x_{i+1} = x_i - \ln b_i \tag{1}$$

$$y_{i+1} = y_i b_i \tag{2}$$

Here $x_0$ is the operand, x, where x can be limited to the range $[0, \ln 2)$ because any computation of $e^x$ where x is not in this range can be reduced to a computation of $e^x$ where x is in this range. (Israel Koren's book entitled *Computer Arithmetic Algorithms*, Prentice-Hall, 1993, explains this point as well as the entire traditional algorithm.)

We iterate according to (1) until $x_n = 0$ for some n. We then have $x_n = 0 = x_0 - \Sigma_{i=1}^{n-1} \ln b_i$, that is, $x_0 = \ln \pi_{i=0}^{n-1} b_i$. Hence it follows that $\pi_{i=0}^{n-1} b_i = e^{x_0}$, which is $e^x$. Solving the recurrence (2) for $y_n$ yields $y_n = y_0 \pi_{i=0}^{n-1} b_i = y_0 e^x$, which is just slightly more general than $e^x$. Thus the task of computing $e^x$ is reduced to the task of finding a sequence $\{b_i\}$ and a number n such that $\Sigma_{i=0}^{n-1} \ln b_i = x$ and then computing $y_0 \pi_{i=0}^{n-1} b_i$. In order to be useful, the $b_i$'s must not merely exist, but it must also be easy to compute a product by each $b_i$. It turns out that if $b_i = 1 + s_i 2^{-i}$, where $s_i = 0$ or $1$ would satisfy the aforementioned properties.

The remaining thing to consider is how to choose $s_i$ for each i to guarantee convergence of the $x_i$'s to zero. It turns out that we can pick $s_i$ by trial subtraction: First try picking $s_i$ to be 1, yielding $x_{i+1} = x_i - \ln(1 + 2^{-i})$. If $x_{i+1} \geq 0$, then the choice of $s_i$ is correct.

But otherwise, choose $s_i = 0$ instead, yielding $x_{i+1} = x_i$. This process is akin to that of bit-by-bit division, hence the name "pseudodivision" for these iterations.

It is not apparent how to combine several such iterations into 1 step. Ercegovac (M. Ercegovac, "Radix-16 Evaluation of Certain Elementary Functions," IEEE Trans. Comput., C-22: 561–566 (1973)) showed how to compute the logarithm and exponential functions in radix-16. However, each iteration is done at a fairly high cost, and it is not clear how Ercegovac's scheme can be adapted to the computation of sine and cosine.

Accordingly, notwithstanding the abovementioned methods used in machinery for computing exponential and trigonometric functions, there continues to be a need for new types of machinery for computing such functions that are fast and not too large.

SUMMARY OF THE INVENTION

It is therefore the object of the present invention to provide circuits for computing exponential and trigonometric functions at high speed and reasonable cost.

This and other objects of the invention are provided by a circuit that uses a novel computational method wherein eight radix-2 iterations (which we will also call "logical iterations") are combined into one larger iteration (which we will also call "physical iterations"). In each of the logical (that is, radix- 2) iterations, only low-precision (and therefore very fast) adders are used, causing temporary error to accumulate. After each physical (larger) iteration (comprising 8 logical (smaller) iterations) is completed, fast and complete correction of the aforementioned temporary error is performed. After eight physical iterations and corrections, all 64 smaller iterations would therefore be completed quickly and without error, that is, with no more error than if we were to simply perform only the smaller iterations in the first place.

BRIEF DESCRIPTION OF THE FIGURES

FIG. 4 illustrates tabulation of $\ln(1+2^{-i})$ to full (64-bit) precision.

FIG. 5 illustrates tabulation of $\ln(1+2^{-i})$ to nine bits of precision.

FIG. 6 illustrates tabulation of $\tan^{-1} 2^{-i}$ to full (64-bit) precision.

FIG. 7 illustrates tabulation of $\tan^{-1} 2^{-i}$ to nine bits of precision.

FIG. 8 illustrates tabulation of the recoding rules transforming ordinary binary representations into signed-digit representations.

DESCRIPTION OF THE INVENTION

Figure 1:
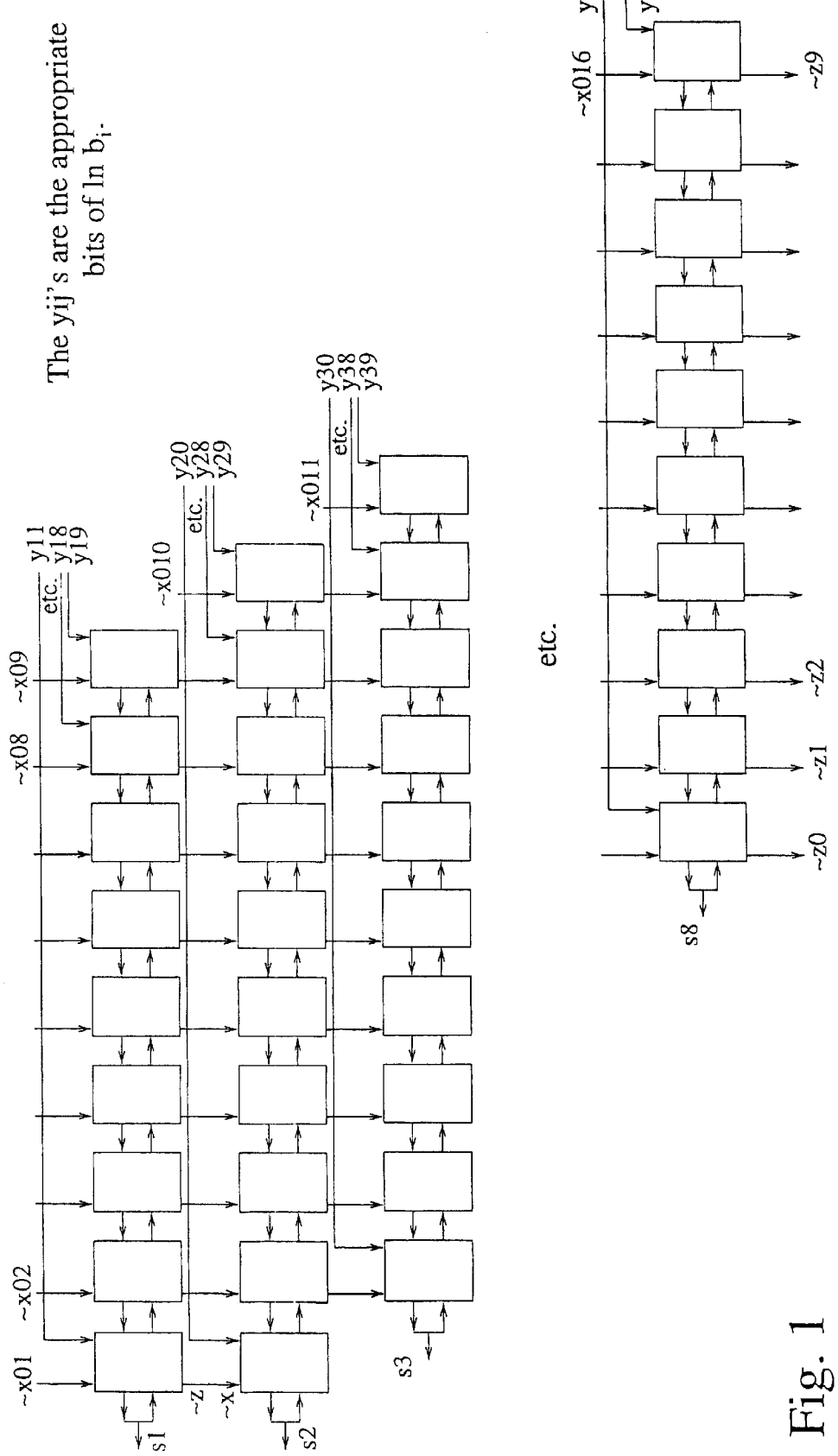
FIG. 1 schematically illustrates the first part of the Master circuit.

The present invention will now be described more fully hereinafter with reference to the accompanying figures and tables, in which preferred embodiments of the invention are shown. This invention may, however, be embodied in different forms depending on the particular configuration or layout of the circuit and should not be limited to the embodiments set forth herein. Rather, these embodiments are provided so that this disclosure will be thorough and complete, and will fully convey the scope of the invention to those skilled in the art.

The new circuits, though applicable for other word lengths, will be described in terms of an operand (mantissa) length of 64 bits. We will first describe the circuit for computing $e^x$, then later describe the circuit for computing sine and cosine.

Figure 5:
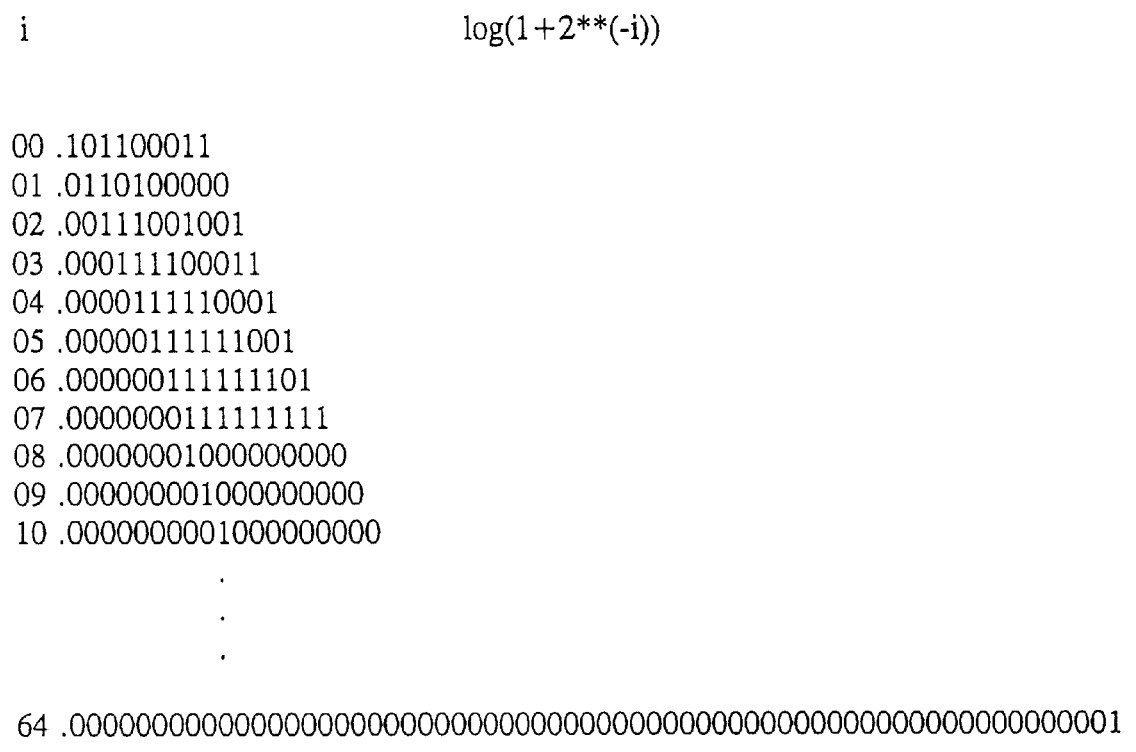

The new circuits are of the digit-by-digit type, as introduced in item number 5, Section 3. However, instead of computing the $x_i$'s we will compute quantities called $\tilde{x}_i$'s, which are approximants of $x_i$'s that can be quickly computed. In order to define the $\tilde{x}_i$'s, we must first define $\tilde{\ln}(1+2^{-i})$ to be the number obtained by rounding up $\ln(1+2^{-i})$ to keep only 9 significant figures. (For example, $\ln(1+2^{-3})=$ 0.0001111100010011110000111 . . . , and thus $\tilde{\ln}(1+2^{-3})=0.0001111100011$.) The full and tilde forms of the logarithms can be found in FIGS. 4 and 5, respectively. Next we define the $\tilde{x}_i$'s: $\tilde{x}_0=x_0$, and in general, we compute $\widetilde{x_{i+1}}$ as follows:

1. Compute $\tilde{D}_i$, defined to be $\tilde{x}_i-\tilde{\ln}(1+2^{-i})$.
2. If $\tilde{D}_i \geqq 0$ then tentatively (that is, temporarily) set $\widetilde{x_{i+1}} = \tilde{D}_i$; also let the Boolean flag $s_i$ be 1;
   Else tentatively set $\widetilde{x_{i+1}} = \tilde{x}_i$ and let $s_i=0$.
3. If i+1 ≡ 0(mod 8) then let the final value of $\widetilde{x_{i+1}}$ be the same as its tentative (temporary) value;
   Else let k=i−7. (Note that k≡1(mod 8).) Compute $x'_k$, $x'_{k+}, \ldots, x'_{i+1}$, which are defined as follows: let $x'_k = \tilde{x}_k$. Then for $j \geqq k$, let $x'_{j+1}=x'_j-\ln(1+s_j 2^{-j})$. This time the natural logarithms are of full precision (64 bits, round-to-nearest, counting from the binary point to the right). Note, however, that we use the Boolean flags $s_j$ computed earlier in Step 2. This fact means that we don't do a trial subtraction again, a crucial fact that gives rise to great speed of computation.
   Now we compute $x_i+1$ (final) from $x'_{i+1}$ as follows: do a full-precision trial subtraction; that is, compute D′, which is defined as $x'_{i+1}-\ln(1+2^{-i})$. If D′≧0 then set $x_i+1=D'$. Else set $x_i+1=x'_{i+1}$. We emphasize that this last paragraph only applies when i+1≡0(mod 8).

The circuit for computing $e^x$ consists of a master part and a slave part, to use Baker's terminology. (P. W. Baker, "Predictive Algorithms for Some Elementary Functions in Radix 2," Electronics Letters, vol. 9, pp. 493–494, 1973) The master part of the circuit is the part that iterates according to equation (1) and the slave part iterates according to equation (2).

Our circuits differ from Baker's in that ours perform sequential iterations, whereas Baker's circuit was purely combinational. Baker's approach would yield extremely large circuit calculations with 64 bits of mantissa, and was more suited to 16-bit calculations.

The master part of our circuit itself consists of 2 part, namely:

(a) a low precision part with 9/10-bit carry-propagate adders (actually borrow-propagate subtractors), whose main function is to compute the Boolean flags $s_i$'s. Each adder should be made using a fast carry technique such as the carry-skip or the carry-lookahead technique.

(b) a high precision part with 64-bit adders, for computing the $\tilde{x}_i$'s and $x'_i$'s. Most of these large adders are of the carry-save type, requiring no carry propagation, except we need two carry-propagate adders for each interval of eight indices i. Note that 64 bits of precision is usually an overkill for IEEE 754 double-precision numbers, since we only need 53 bits for the result plus 3 or 4 guard bits.

We will now discuss the (a) and (b) parts in detail. Part (a), if ripple subtractors are to be used, is shown in FIG. 1. This part consists of eight rows of borrow-propagate subtractors (If faster subtractors than ripple subtractors are used, then it would be obvious how to change the figure accordingly.) The first row is a 9-bit subtractor, while the other seven rows are 10-bit subtractors. Each full-subtractor cell in part (a) is a "controlled full subtractor," of the same type used in array division circuits. This means that it has a control input a in addition to its usual 3 inputs $\bar{x}, y$, and $B_{in}$ (borrow in). The outputs are defined as follows:

$z=(x \oplus y \oplus B_{in})a + x\bar{a}$ $B_{out}=\bar{x}y + \bar{x}B_{in} + yB_{in}$ In a preferred embodiment, these eight 9- or 10-bit adders should not be ripple adders, but should be faster adders. Perhaps carry-skip adders should be used because they are very fast yet very small in layout area.

Figure 2:
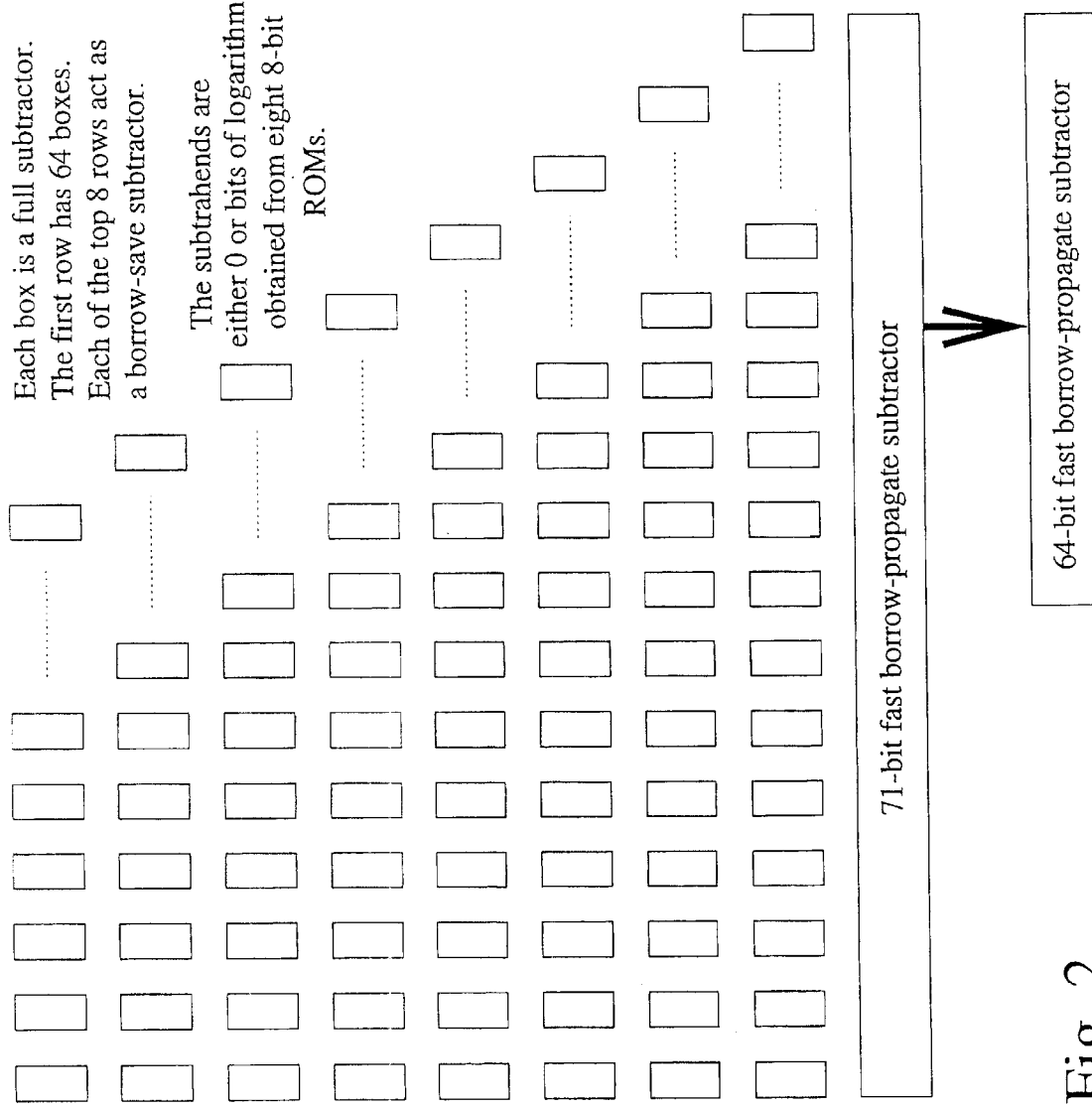
FIG. 2 schematically illustrates the second part of the Master circuit.

FIG. 2 shows Part (b) of the master section of the circuit. This part computes the $x'_j$'s and for k≡0(mod 8) it also computes $\tilde{x}_k$ (final). This circuit has eight high-precision carry-save adders (no carry propagation), and only two carry-propagate adders (CPA's) at the bottom of the circuit. The bottommost adder is used to eliminate the possible extra 1 and obtain the final value of $\tilde{x}_k$, as discussed before. For these two CPA's we recommend fast, small adders such as carry-skip adders. The usual, uncontrolled full subtractors (full adders) are used in part (b) of the master section of the circuit.

Note that part (a) and (b) of the master circuit both get information from the same set of eight small ROM's, each having only eight 64-bit words. ROM No. 1, the ROM that feeds information into the topmost row of full subtractors, keep $\ln(1+2^{-i})$, where $i\equiv 1 \pmod 8$. In general, ROM No. j, the ROM that feeds information into the jth row of full subtractors, keeps $\ln(1+2^{-i})$, where $i\equiv j \pmod 8$. Part (a) gets logs with 8 significant bits via multiplexers. For all the logs up to i=31, the rounding up of the logs for part (a) is achieved by tying the borrow input of the least significant bit to logic 1. However, for $i \geq 32$ there is no need to round the logs up since the 64-bit version of the logs only has one occurrence of 1. The ability to choose whether to have a borrow in of 1 or 0 costs 8 multiplexers.

Figure 3:
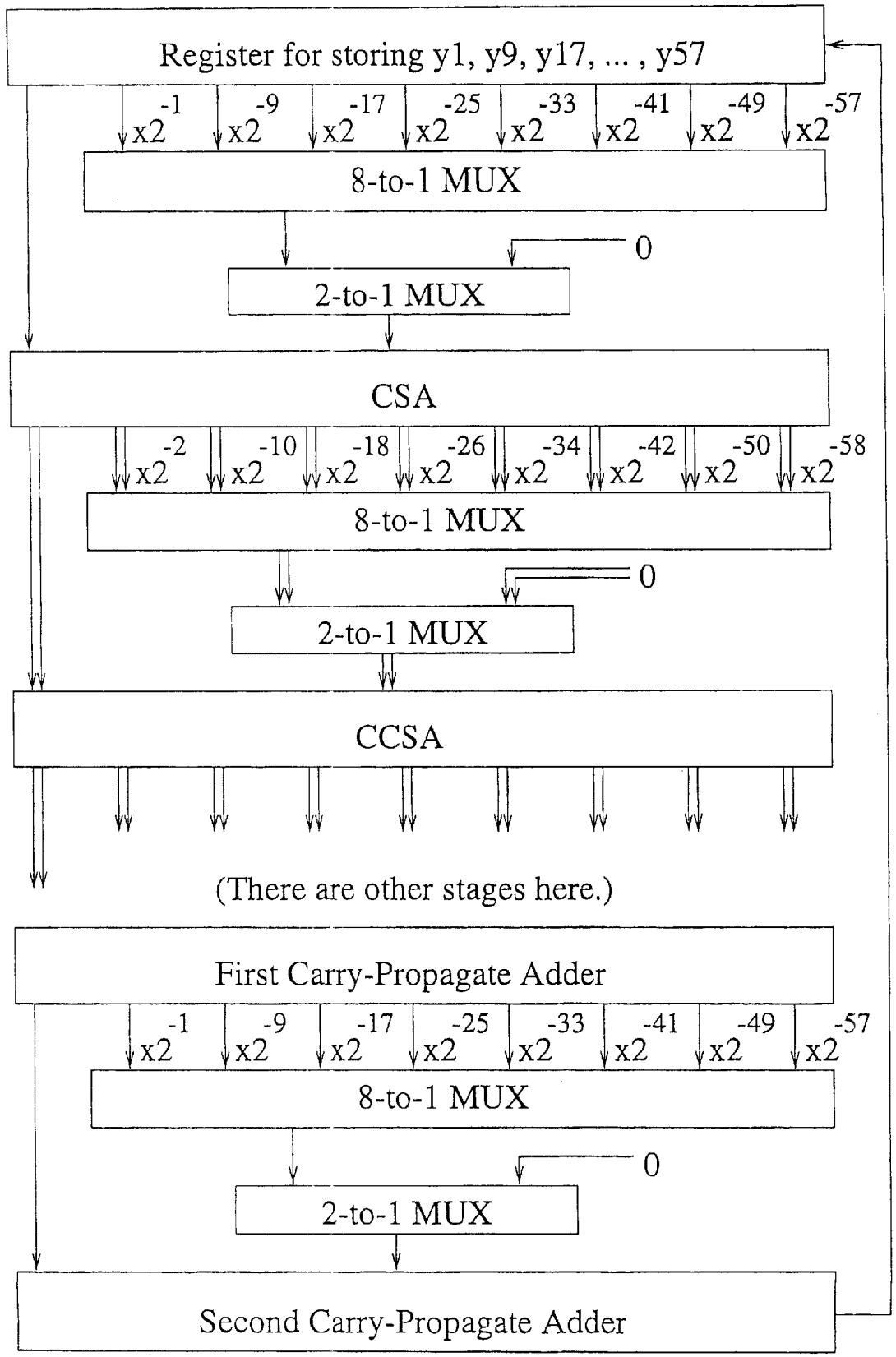
FIG. 3 schematically illustrates the Slave circuit.

Now we will discuss the "slave" part of the circuit (again using Baker's terminology), that is, the part of the circuit that iterates according to equation (2). This part is called slave because it does not make any decisions. More particularly it does not have to compute the $s'_i$s. Therefore it is easy to see that we can use CSA's (carry-save adders) instead of carry-propagate adders or CPA's. However, just as Baker discovered, what we really need are cascaded CSA's, or CCSA's for short, instead of the usual CSA's. The reason is that we need to add four numbers, leaving two numbers as a result. Note that at the bottom of the slave circuit we need a pair of CPA's, just like at the bottom of the (b) part of the master circuit. The slave circuit is shown in FIG. 3.

The circuit just described can be sped up further by noting the simplicity of the ln and $\widetilde{\ln}$ functions. To do this we apply a well-known idea to the novel circuit presented above. In particular, we note that $\widetilde{\ln}(1+2^{-i})$, for $i \geq 8$, is just equal to $2^{-i}$ due to rounding. Therefore, in each physical iteration number 2 through 8 we can determine the $s_i$'s simply by inspecting the eight bits of the $\tilde{x}_j$ just before that physical iteration.

A circuit for computing sine and cosine can be made very similar to the type of circuit of computing $e^x$ just described. The equations to be iterated for sine and cosine are:

$$x_{i+1} = x_i - \arctan \gamma_i \quad (3)$$

$$y_{i+1} = y_i(1+j\gamma_i) \quad (4)$$

where $j=\sqrt{-1}$. Equation (4) can be rewritten as:

$$y_{i+1} = y_i \sqrt{1+\gamma_i^2} e^{j \arctan \gamma_i} \quad (5)$$

Thus if we let $y_0=1$ (for simplicity), then when $x_i \to 0$, say at i=n, we have $$y_i \to \left(\prod_{i=0}^{n-1} \sqrt{1+\gamma_i^2}\right) e^{j\sum_{i=0}^{n-1} \arctan \gamma_i} = \quad (6)$$

$$\prod_{i=0}^{n-1} \sqrt{1+\gamma_i^2} \left(\cos \sum_{i=0}^{n-1} \arctan \gamma_i + j\sin \sum_{i=0}^{n-1} \arctan \gamma_i\right).$$

Therefore if we let $Z_i = \Re(y_i)$ and $W_i = \Im(y_i)$, then $$Z_i \to \left(\prod_{i=0}^{n-1} \sqrt{1+\gamma_i^2}\right) \cos x_0, \text{ and}$$

$$W_i \to \left(\prod_{i=0}^{n-1} \sqrt{1+\gamma_i^2}\right) \sin x_0$$

If we let $\gamma_i = s_i 2^{-i}$, where $s_i = 1$ or $-1$, then $Z_i$ and $W_i$ would be easy to compute, and $\pi_{i=0}^{n-1} \sqrt{1+\gamma_i^2}$ would be a constant K (K=1.6467602581210656648366 if n=64). So we can compute $\cos x_0$ and $\sin x_0$ by letting $y_0=1/K$ and then iterating according to equations (3) and (4), keeping the real and imaginary part of $y_i$ in separate registers. Note that the slave part of the circuit will be approximately twice as large as was needed for the exponential function because in the slave circuit we need an array for computing the $Z_i$'s and another array for computing the $W_i$'s.

Now let us see how low-precision arithmetic can help speed up the entire computation. Instead of computing the $x_i$'s, we will compute certain quantities called $\tilde{x}_i$'s. This idea is similar to the one behind our algorithm for computing the exponential function. However, some nontrivial modifications are required to accommodate the fact that the $s_i$'s are now ±1 instead of 0 or 1.

Define $\widetilde{\arctan2}\ 2^{-i}$ as the version of arc tan $2^{-i}$ with 9 significant figures, rounded up. Table 4 contains the tilde form of the arc tangent, whereas FIG. 6 contains the 64-bit, round-to-nearest form. We now define the $\tilde{x}_i$'s: $\tilde{x}_0 = x_0$, which is the operand confined within the range $[0, \pi/2]$; and in general we form $\tilde{x}_{i+1}$ as follows:

1. If $\tilde{x}_i \geq 0$ then let $\tilde{x}_{i+1}(\text{tentative}) = \tilde{x}_i - \widetilde{\arctan2}\ 2^{-i}$ i.e.; $s_i = +1$ else let $\tilde{x}_{i+1}(\text{tent.}) = \tilde{x}_i + \widetilde{\arctan2}\ 2^{-i}$ i.e.; $s_i = -1$ 2. If i+1 0 (mod 8) then let $\tilde{x}_{i+1}(\text{final}) = \tilde{x}_{i+1}(\text{tent.})$ Else compute a quantity called $x'_{i+1}$ from $\tilde{x}_{i-7}$ (final) using the same $s_i$'s as in step 1, but using full-precision arithmetic instead of low-precision arithmetic. These primed x's are simply the exact analogy to the ones used in the computation of the exponential function. Note that we need 8 stages of carry-save adders (very fast) and only one stage of carry-propagate adder.

3. In the "else" case in the previous step, we compute $\tilde{x}_{i+1}$(final) from $x'_{i+1}$. Simply let $\tilde{x}_{i+1}(\text{final}) = x'_{i+1} - \text{sgn}(x'_{i+1}) \widetilde{\arctan2}\ 2^{-i}$.

K will still be a constant, but will be a little larger than 1.6467602581210656648366—more precisely, we have $$K = \prod_{i=0}^{63} \sqrt{1+2^{-2i}} \prod_{i=1}^{8} \sqrt{1+2^{-2(8i-1)}}$$

$$= 1.6468105132559545006937$$

The computation of sine and cosine can be sped up further. As we have seen from FIG. 7, the tilde form of the arc tan's all have only one 1 at the ith position after the first iteration. Likewise the 64-bit form of the arc tan's are of the same form after the third physical iteration. These observations lead to a speedup of our algorithm by speeding up the low-precision part of the "master" circuit, which seems to be the slowest part in usual implementations because of the lack of carry-save adders.

The main idea behind the speedup (which was used in P. W. Baker, "Suggestion for a Fast Binary Sine/Cosine Generator," IEEE Transactions on Computers, pp. 1,134–1, 136, November 1976) is as follows: Recode the first 8 significant bits of $\tilde{x}_8$ using the signed digits 1 and $\bar{1}$, where $\bar{1}=-1$.[2] This recoding can be done easily in constant time by inspection according to Baker. (The rules for the conversion are simple: the leftmost digit is always a 1.[3]

[2]This representation is not the usual SD (signed digit) representation, since it does not contain the digit 0 and does not involve redundancy.
[3]If the number to be converted were negative, which never happens in our application, then the leftmost digit would be $\bar{1}$).

Then the other digits of the converted number are obtained according to FIG. 8.) After the recoding has been performed, we inspect these recoded bits and determine whether to add or subtract each arc tan $2^{-i}$, $9 \leq i \leq 16$—if the recoded bit i is 1 then subtract arc tan $2^{-i}$, else add it. Note that we can do all these determinations in 1 step after the recoding. After all the eight add/subtract operations, we obtain $\tilde{x}_{16}$(tent.). So we still have to compute $\tilde{x}_{16}$(final) in the same way we computed a final $\tilde{x}_i$ from its tentative value in the previous section, when i≡0 (mod 8). We compute $\tilde{x}_{24}$, tentative and final, in the same way.

The remaining 5 physical iterations are simpler, in that the final values of $\tilde{x}_{32}, \tilde{x}_{40}, \ldots, \tilde{x}_{64}$ are the same as their tentative value because the 64-bit version of the arc tan's involved are all of form 2.

We close this section by giving an example.

EXAMPLE

We will show how the low-precision arithmetic unit can determine $s_8$ through $s_{15}$. Suppose $$\tilde{x}_8(\text{final}) = \underbrace{000000}_{7\ \text{zeores}} 11011100 \ldots$$

To determine those $s_i$'s, we convert the next 8 digits to the right of the initial 7 zeroes to a representation that uses the digits 1 and $\bar{1}$. This conversion yields the digit string 111$\bar{1}$111$\bar{1}$, and thus we simply conclude that $s_8, s_9, s_{10}, \ldots,$ $s_{15}$=1, 1, 1, −1, 1, 1, 1, and −1, respectively. Note also that the remainder generated by the division process can simply be ignored.

In the figures and specifications, there have been disclosed typical preferred embodiments of the invention and, although specific terms are employed, they are used in a generic and descriptive sense only and not for the purposes of limitation, the scope of the invention being set forth in the following claims. (Note in particular that the 64 bits of precision is just an example. Other numbers of bits of precisions are also possible. Also note that instead of 8 larger iteration each comprising 8 smaller iterations, the circuits could also be built with m larger iterations each comprising n smaller iterations, where m×n=number of bits after the binary point.)

I claim:

1. A 64-bit precision digital circuit for compute sin $x_0$ and cos $x_0$ comprising:

(a) a master circuit capable of iteratively and sequentially computing the remainders $\tilde{x}_i$, wherein said $\tilde{x}_i$ are computed by first setting $\tilde{x}_0$ to $x_0$; and in general, $\tilde{x}_{i+1}$ is formed as follows:

i. compute $\tilde{x}_{i+1}$(tentative)=$\tilde{x}_i - s_i \widetilde{\text{arctan}}2\ 2^{-i}$, where $s_i$=sgn$\tilde{x}_i$, where $\widetilde{\text{arctan}}2\ 2^{-i}$ is the version of arc tan $2^{-i}$ with 9 significant figures, rounded up;

ii. if i+1 0mod 8 then let $\tilde{x}_{i+1}$(final)=$\tilde{x}_{i+1}$(tentative); else compute a quantity called x'$_{i+1}$ from $\tilde{x}_{i-7}$ (final) using the same $s_i$'s as in step 1, but using full-precision arithmetic instead of low-precision arithmetic; that is, let x'$_{i-7}$=$\tilde{x}_{i-7}$, and for 1≧i−7, let x'$_{l+1}$=x'$_l^i$−$s_l$ arc tan $2^{-l}$;

iii. in the else case in the previous step, computing $\tilde{x}_{i+1}$ (final) from x'$_{i+1}$, simply let $\tilde{x}_{i+1}$(final)=x'$_{i+1}$−sgn(x'$_{i+1}$)$\widetilde{\text{arctan}}2\ 2^{-i}$.

(b) A slave circuit capable of iteratively and sequentially computing the quantities $y_i$'s, wherein said $y_i$'s are defined by letting $y_0$=constant, and for i>0, $$y_{i+1}=y_i b_i,\ b_i=1+js_i 2^{-i}.$$

2. The circuit of claim 3, wherein the last iterations 25 through 64 are performed instead by recoding the remainder using the digits 1 and $\bar{1}$.

* * * * *